(12) United States Patent
Tadokoro

(10) Patent No.: US 6,234,022 B1
(45) Date of Patent: May 22, 2001

(54) BEARING RIGIDITY EVALUATION APPARATUS

(75) Inventor: Hisakazu Tadokoro, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/373,241

(22) Filed: Aug. 12, 1999

(30) Foreign Application Priority Data

Aug. 28, 1998 (JP) .................................................. 10-243178

(51) Int. Cl.[7] .................................................. G01M 13/04
(52) U.S. Cl. .................................................. 73/593; 73/660
(58) Field of Search ........................ 73/593, 660, 862.49

(56) References Cited

U.S. PATENT DOCUMENTS

| | | | |
|---|---|---|---|
| 5,109,700 | * 5/1992 | Hicho | 73/660 |
| 5,263,372 | 11/1993 | Matsuzaki et al. | 73/593 |
| 5,477,730 | * 12/1995 | Carter | 73/593 |
| 5,517,858 | * 5/1996 | Matsuzaki et al. | 73/593 |
| 5,533,400 | * 7/1996 | Gasch et al. | 73/593 |
| 5,618,993 | * 4/1997 | Matsumoto et al. | 73/587 |
| 5,686,669 | * 11/1997 | Hernandez et al. | 73/660 |

FOREIGN PATENT DOCUMENTS

| | | | |
|---|---|---|---|
| 2-61700 | 12/1990 | (JP) | G01M/13/04 |
| 5-10835 | 1/1993 | (JP) | G01L/5/00 |
| 10-96672 | 4/1998 | (JP) | G01L/5/00 |

\* cited by examiner

Primary Examiner—Richard A. Moller
(74) Attorney, Agent, or Firm—Sughrue, Mion, Zinn, Macpeak & Seas, PLLC

(57) ABSTRACT

In a bearing rigidity evaluation apparatus, a vibration portion 1 excites a bearing 4 to vibrate. Vibrations of the bearing 4 thus excited are detected by vibration detecting sensors 21a, 21b and 21c. Output signals of the vibration detecting sensors 21b and 21c for an outer race 42 are added up in time sequence by an adder 23 and then supplied to a transfer function computing unit 3a. An output signal of the vibration detecting sensor 21a is supplied to the transfer function computing unit 3a. The transfer function computing unit 3a calculates a transfer function H between inner and outer races (between a hub shaft 41 and the outer race 42) by FFT. On the basis of this transfer function H, there is obtained a vibration mode in which a resonance frequency (natural frequency) fa appears in a position of $-\pi/2$ phase difference from local-mode vibration components (in-phase components) contained in the aforementioned input signals after erasing of the local-mode vibration components.

5 Claims, 6 Drawing Sheets

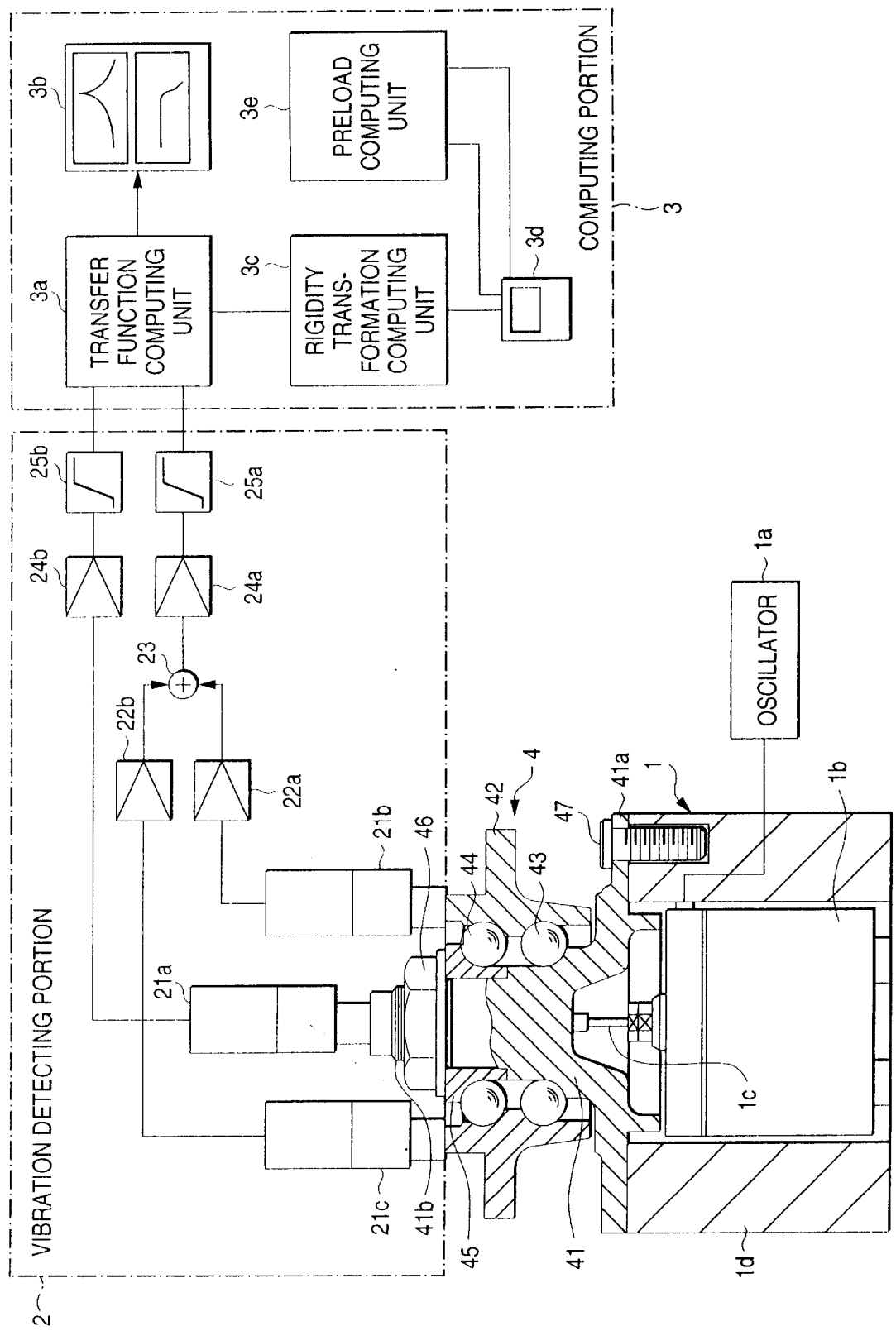

BEARING RIGIDITY EVALUATION APPARATUS

BACKGROUND OF THE INVENTION

1. Field of the Invention

The present invention relates to a bearing rigidity evaluation apparatus for evaluating bearing rigidity of a bearing such as a double row bearing, a duplex bearing, or the like, to which a preload is applied.

2. Description of the Related Art

Heretofore, a double row bearing or a duplex bearing to which a preload is applied needs to have high rigidity in terms of performance of a machine equipped with the bearing. However, if the amount of the preload increases so that rigidity becomes too high, the excessive preload causes lowering of bearing performance (such as increase of frictional moment, abnormal heating, fatigue life, and so on). Accordingly, the value of bearing rigidity needs to be controlled in a predetermined range while being related to the amount of the preload.

The following apparatus is known as an apparatus for measuring the value of rigidity of a bearing. Japanese Patent Unexamined Publication No. Hei.5-10835 discloses a method in which a vibration signal generated from a rotating bearing is subjected to frequency analysis to thereby obtain both a contact angle of a rolling body and a resonance frequency of the bearing so as to obtain both the bearing rigidity and the amount of preload on the basis of the contact angle and the resonance frequency. Further, Japanese Patent Examined Publication No. Hei.2-61700 discloses a method in which vibrations given to a bearing box or a shaft by a vibrating machine is detected by a velocity or acceleration sensor and amplified by an amplifier, and an output signal of the amplifier is analyzed by a frequency analyzer to detect a resonance frequency of a bearing. The relation between the detected resonance frequency and the amount of preload is obtained in advance by calculation such as a finite-element method, or the like, so that the amount of preload can be detected on the basis of the resonance frequency.

Both the methods described in Japanese Patent Examined Publication No. Hei.2-61700 and Japanese Patent Unexamined Publication No.5-10835, however, utilize resonance. Accordingly, in the case where the value of rigidity of a duplex bearing is to be measured, when the rigidity of the bearing is relatively low, there is no problem. On the other hand, the rigidity of the bearing is high, a vibration mode due to the bearing as a structural body and a vibration mode due to a bearing spring are coupled with each other, so that it is difficult to detect rigidity caused by the bearing spring.

Further, even in the case of a bearing as a single body, the same problem as described above arises in accordance with local vibration modes of a low-rigidity portion-including bearing such as a flanged bearing and elastic vibration modes of inner and outer races. Accordingly, in a bearing requiring high rigidity, bearing rigidity is hardly detected on the basis of the resonance frequency by use of a vibration model having inner and outer races as mass points as described in Japanese Patent Unexamined Publication No. Hei.5-10835. Further, when external vibrations in a measurement frequency band are detected, S/N ratio with respect to the external vibrations also becomes a subject of discussion.

SUMMARY OF THE INVENTION

In view of the aforementioned problem, it is an object of the present invention to provide a bearing rigidity evaluation apparatus in which bearing rigidity of a bearing to which a preload is applied can be obtained accurately.

To attain the above object, there is provided a bearing rigidity evaluation apparatus for evaluating bearing rigidity of a bearing such as a double row bearing, a duplex bearing, or the like, to which a preload is applied, comprising: a vibrating machine for giving vibrations with a predetermined frequency axially to an inner race of the bearing or to a shaft fitted to the inner race; at least one pair of outer race vibration detecting means respectively provided in positions symmetrical to each other with respect to a point of center of the bearing for detecting vibrations of an outer race of the bearing; an inner race vibration detecting means for detecting vibrations in an axial center position of either one of the inner race and the shaft fitted to the inner race; an addition means for adding output signals of the at least one pair of outer race vibration detecting means; a transfer function computing unit for calculating a resonance frequency (natural frequency) of the bearing by obtaining a transfer function between the outer race and either one of the inner race and the shaft to thereby eliminate an in-phase component signal contained in an output signal of the inner race vibration detecting means and an output signal of the addition means; and a rigidity transformation computing unit for obtaining the bearing rigidity on the basis of the resonance frequency (natural frequency) calculated by the transfer function computing unit.

In the above bearing rigidity evaluation apparatus, vibrations having a predetermined frequency are given axially to an inner race of the bearing or to a shaft fitted to the inner race to thereby excite the bearing to vibrate. Vibration modes of the excited bearing include: a vibration mode caused by a bearing spring in a frequency band of a vibrating force (a vibration mode in an axial direction of the bearing); an elastic bending mode of the outer race coupled with the vibration mode caused by the bearing spring; a vibration mode uncoupled with the vibration mode caused by the bearing spring; and external vibrations mixed from the outside. Vibrations of the excited bearing are detected by the inner race vibration detecting means and the outer race vibration detecting means. In this occasion, when vibrations detected by at least one pair of outer race vibration detecting means are added up in time sequence by an adding means, conical vibration components are erased. The vibration mode uncoupled with the bearing spring and the external vibrations mixed with the detection system are detected as components of the same phase and the same amplitude in the inner and outer races. Accordingly, when a transfer function between the inner and outer races is obtained on the basis of vibrations of the outer race after erasing of the conical vibration components and vibrations of the inner race or of the shaft fitted to the inner race, which are detected by the inner race vibration detecting means, in-phase components (the uncoupled vibration mode or the external vibrations mixed with detecting system) contained in the respective vibrations are erased so that a resonance frequency (natural frequency) of the bearing is obtained. Further, bearing rigidity is obtained on the basis of the calculated resonance frequency (natural frequency). Accordingly, bearing rigidity of a bearing to which a preload is applied can be obtained accurately.

Preferably, configuration is made so that a transfer function is obtained after low-frequency components contained in vibrations detected by the inner race vibration detecting means and in vibrations added up by the adding means, respectively, are removed by filter means. By this configuration, vibration components as a cause of noise are removed, so that S/N ratio can be improved.

Preferably, configuration is made so that a preload applied to the bearing is calculated on the basis of both the obtained bearing rigidity and a contact angle of the bearing. By this configuration, the preload applied to the bearing can be obtained accurately, so that quality assurance accuracy with respect to the amount of preload applied to the bearing can be improved.

BRIEF DESCRIPTION OF THE DRAWINGS

FIG. 1 is a block diagram showing the overall configuration of an embodiment of a bearing rigidity evaluation apparatus according to the present invention;

DETAILED DESCRIPTION OF THE PREFERRED EMBODIMENTS

Figure 2A:
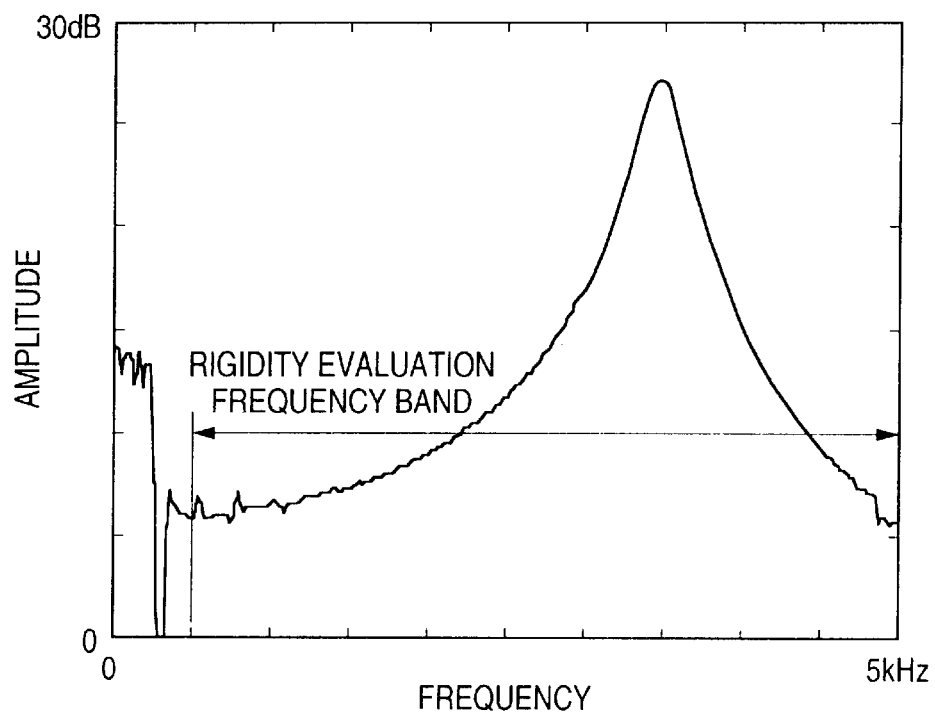
FIGS. 2A and 2B are graphs showing frequency characteristic in amplitude and phase of a transfer function calculated in the bearing rigidity evaluation apparatus depicted in FIG. 1.

An embodiment of the present invention will be described below with reference to the drawings.

FIG. 1 is a block diagram showing the overall configuration of an embodiment of the bearing rigidity evaluation apparatus according to the present invention.

As shown in FIG. 1, the bearing rigidity evaluation apparatus according to this embodiment is provided with a vibration portion 1 for giving vibrations with a predetermined frequency to a bearing to which a preload is applied, a vibration detecting portion 2 for detecting vibrations of inner and outer races of the bearing, and a computing portion 3 for obtaining rigidity of the bearing 4 on the basis of the detected vibrations of the inner and outer races of the bearing and calculating preload applied to the bearing on the basis of the obtained bearing rigidity. A double row bearing (hereinafter simply referred to as bearing) 4 constituted by a hub III bearing to be attached to a wheel of a car is attached, as a bearing to be measured, to this apparatus.

This bearing 4 has an outer race 42 provided with two rows of rolling surfaces formed on its inner circumference, a hub shaft 41 provided with rolling surfaces formed on its outer circumference so as to be opposite to one row of rolling surfaces of the outer race 42, and an inner race member 45 provided with rolling surfaces formed on its outer circumference so as to be opposite to the other row of rolling surfaces of the outer race 42. The inner race member 45 is forced onto the hub shaft 41. The inner race member 45 and the hub shaft 41 cooperate with each other to form an inner race opposite to the outer race 42. Balls 43 and 44 are inserted between the outer race 42 and the hub shaft 41 and between the outer race 42 and the inner member 45, respectively.

A flange portion 41a is integrally formed in an end portion of the hub shaft 41. The flange portion 41a is provided with a plurality of holes for receiving bolts 47 to fix the bearing 4 to a position as a subject of attachment. A shoulder portion is formed in an intermediate portion of the hub shaft 41. A threaded portion 41b to be thread-engaged with a nut 46 is formed in the other end portion of the hub shaft 41. The inner race member 45 is fastened tight by the nut 46 thread-engaged with the threaded portion 41b while an end portion of the inner race member 45 is pressed against the shoulder portion of the hub shaft 41. By this fastening, preload is applied to the balls 43 and 44 between the outer race 42 and the hub shaft 41 and between the outer race 42 and the inner race member 45. Further, a negative gap is formed between end surfaces of the outer race 42 and the hub shaft 41 which are opposite to each other.

The vibration portion 1 has an oscillator 1a for generating a voltage waveform to sweep sine wave speedily in a range of from a lower-limit frequency to an upper-limit frequency in a measurement frequency band, an electromotive type vibrating machine 1b for generating a vibrating force having both an amplitude and a frequency corresponding to the voltage waveform generated by the oscillator 1a, a vibration rod 1c for transmitting the vibrating force generated by the electromotive type vibrating machine 1b to the hub shaft 41 of the bearing 4, and a vibration-insulating bed 1d for fixing the first inner race (hub shaft) 41 of the bearing 4. The flange portion 41a of the first inner race 41 is placed on the vibration-insulating bed 1d. In this embodiment, a range of from 1 to 5 KHz is set as the measurement frequency band. Sine wave having constant amplitude is swept to generate a voltage waveform so as to generate a vibrating force having constant amplitude in the range of from 1 to 5 KHz. Accordingly, the bearing 4 is excited to vibrate by the aforementioned vibrating force. The vibration mode for exciting the bearing 4 includes an axial rigid-body mode (vibration mode in an axial direction of the bearing 4) caused by a bearing spring in the frequency band of the vibrating force, a conical rigid-body mode (vibration owing to the inclination of the outer race 42), and an elastic bending mode for the flange portion 41a of the hub shaft 41 as local modes and an elastic bending mode for the outer race 42.

The vibration detecting portion 2 has a vibration detecting sensor 21a disposed in the center position of the hub shaft 41, and a pair of vibration detecting sensors 21b and 21c disposed in radially opposite positions, respectively, of the outer race 42. The vibration detecting sensors 21a, 21b and 21c are disposed on a straight line. Each of the vibration detecting sensors 21a, 21b and 21c is constituted by a moving-coil type sensor, which outputs the detected vibration waveform as a voltage signal. In this embodiment, vibrations detected by each of the vibration detecting sensors 21a, 21b and 21c are vibrations in which the respective vibration modes exciting the bearing 4 are combined with one another.

Output signals of the vibration detecting sensors 21b and 21c for the outer race 42 are amplified by corresponding addition amplifiers 22a and 22b respectively and then added up in time sequence by an adder 23. By this addition, the vibration component of the conical rigid-body mode is erased. That is, the output from the adder 23 is a signal in which the vibration component of the conical rigid-body mode has been already erased. The output signal from the adder 23 is amplified by a main amplifier 24a and then supplied to a high-pass filter 25a. Here, the main amplifier 24a reduces the level of the signal to half because the signal supplied to the main amplifier 24a is an added signal. The high-pass filter 25a cuts a lower frequency component (500 Hz to 1 KHz) than the measurement frequency band from the input signal. That is, the vibration component in a range of from 500 Hz to 1 KHz as a cause of external noise is cut by the high-pass filter 25a, so that S/N ratio can be improved. On the other hand, an output signal of the vibration detecting sensor 21a is amplified by a main amplifier 24b and then supplied to a high-pass filter 25b. The high-pass filter 25b cuts a lower frequency component (500 Hz to 1 KHz) than the measurement frequency band from the input signal, that is, the high-pass filter 25b cuts the vibration component which is a cause of external noise.

The computing portion 3 has a transfer function computing unit 3a for receiving output signals of the high-pass filters 25a and 25b. The transfer function computing unit 3a uses Fast Fourier transformation (FFT) to calculate a resonance frequency (natural frequency) fa of the bearing 4 by erasing in-phase components contained in the aforementioned input signals. Specifically, a transfer function H between the inner and outer races (between the hub shaft 41 and the outer race 42) is calculated by means of FFT, so that, on the basis of the transfer function H, there is obtained a vibration mode in which a resonance frequency (natural frequency) fa appears in a position of π/2 phase difference after erasing the local-mode vibration components (in-phase components) contained in the aforementioned input signals. The component of this vibration mode is expressed as a vibration component in which the axial rigidity mode and the elastic bending mode for the outer race 42 are coupled with each other by the transfer function H. This transfer function H is calculated by the following expression (1).

$$H(f) = Sy(f) \cdot Sx^*(f) / Sx(f) \cdot Sx^*(f) \quad (1)$$

in which $Sx(f) \cdot Sx^*(f)$ is a power spectrum of the output of the high-pass filter 25b, and $Sy(f) \cdot Sx^*(f)$ is a cross spectrum between the output of the high-pass filter 25a and the output of the high-pass filter 25b.

The vibration waveform obtained by the transfer function described above is displayed on a waveform display unit 3b. Further, the resonance frequency (natural frequency) fa obtained as described above is supplied to a rigidity transformation computing unit 3c. The rigidity transformation computing unit 3c approximates the relation between bearing rigidity Ka obtained by FEM analysis in advance and the resonance frequency (natural frequency) fa by a polynomial and calculates bearing rigidity Ka corresponding to the resonance frequency (natural frequency) fa supplied by use of the polynomial. Specifically, since a function given by the following expression (2) is defined as a function expressing the relation between the bearing rigidity Ka and the resonance frequency (natural frequency) fa, a contact angle α is given in advance so that discrete values are obtained by FEM analysis. From the discrete values, the aforementioned function is approximated by a polynomial using the resonance frequency (natural frequency) fa as a variable. The resonance frequency (natural frequency) fa obtained by use of this polynomial is converted into bearing rigidity Ka. Thus, the bearing rigidity Ka is obtained.

$$Ka = f(fa, \alpha) \quad (2)$$

Further, the bearing rigidity Ka obtained as described above is supplied to a preload computing unit 3e. The preload computing unit 3e obtains an amount of preload Fa given to the bearing 4 on the basis of the input bearing rigidity Ka. Specifically, since the amount of preload Fa given to the bearing 4 is defined by the function expressed by the following expression (3), a contact angle α is given in advance so that the aforementioned function is approximated by a polynomial. The amount of preload Fa is obtained on the basis of the bearing rigidity Ka obtained by use of this polynomial.

$$Fa = f(Ka, \alpha) \quad (3)$$

Incidentally, the method using both the contact angle α and the resonance frequency (natural frequency) fa to obtain the bearing rigidity Ka and further obtain the amount of preload Fa is described in Japanese Patent Unexamined Publication No. Hei. 5-10835 or Hei. 10-96672. The detailed description of the method will be omitted.

The value of bearing rigidity Ka and the amount of preload Fa obtained in the aforementioned manner are displayed on a display unit 3d.

Figure 2B:
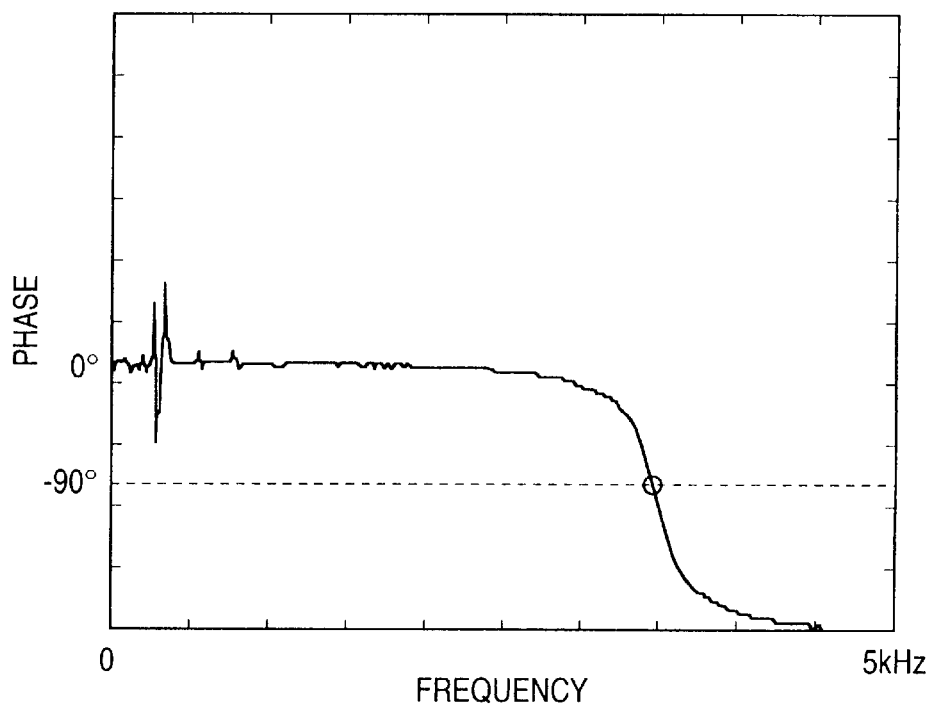
Figure 3:
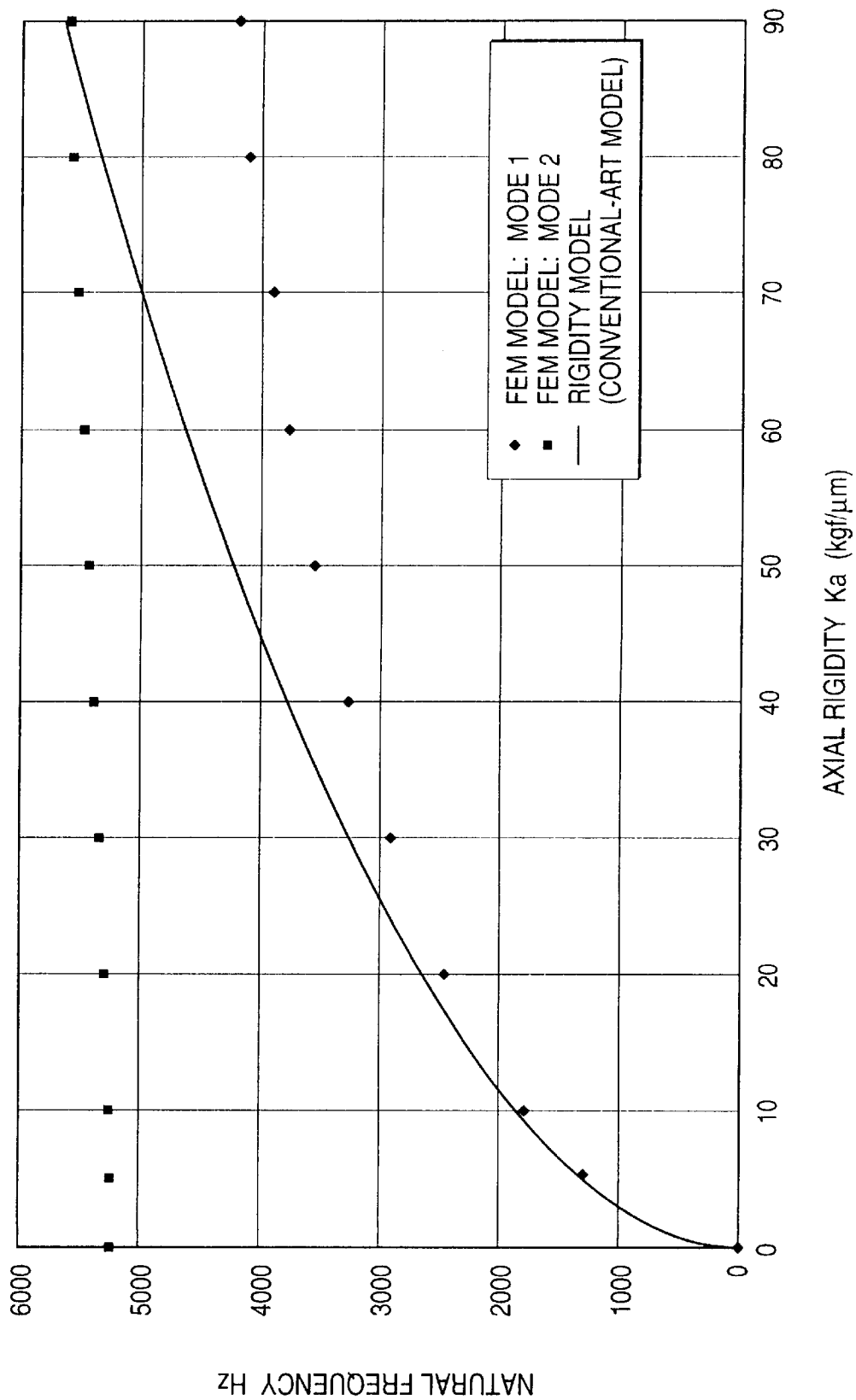
FIG. 3 is a graph showing a curve (represented by the solid line) of the relation between natural frequency (resonance frequency) and axial bearing rigidity in a related rigid-body model and a polynomial (FEM model: dots (♦) in mode 1) used in this embodiment.
Figure 4:
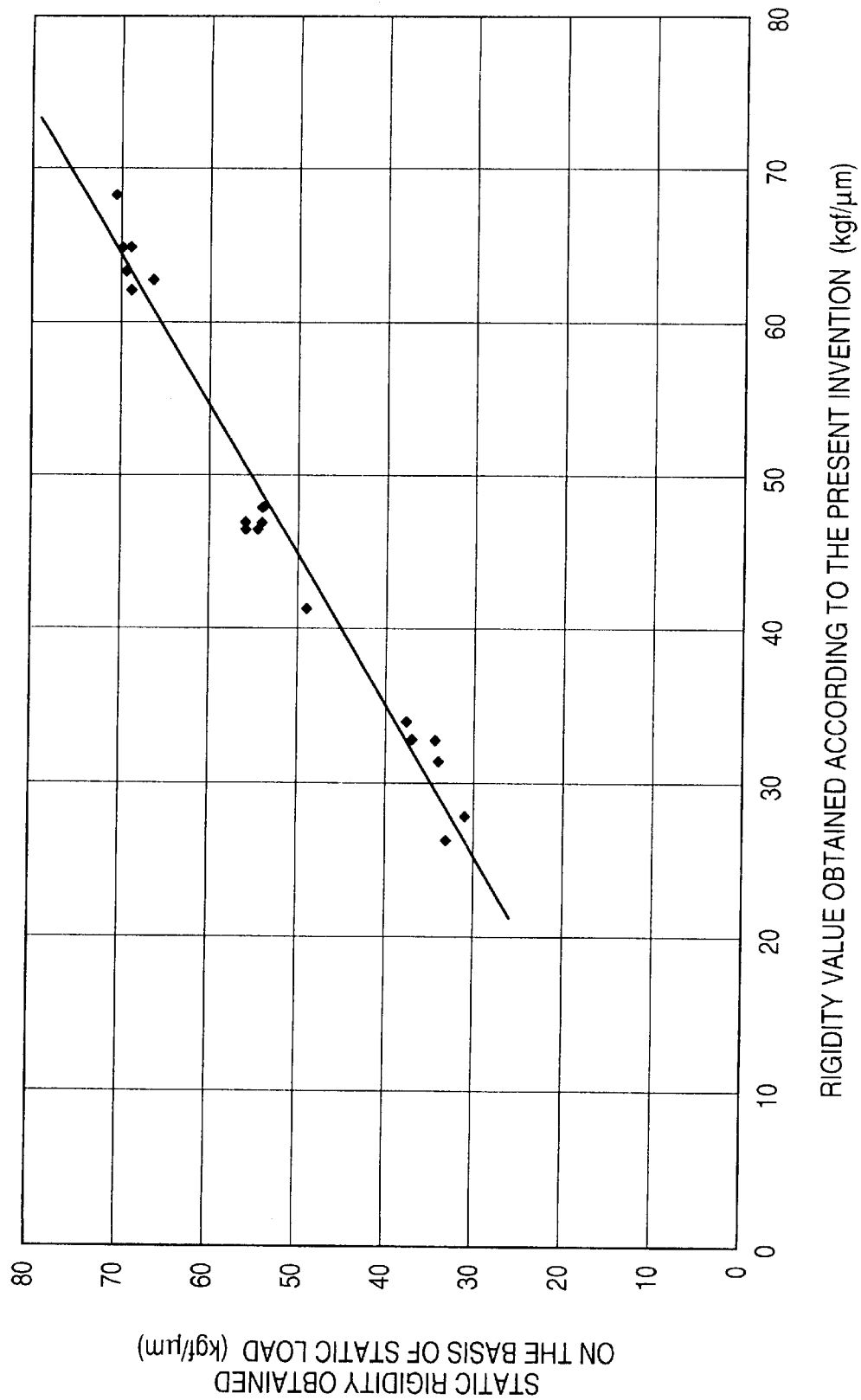
FIG. 4 is a graph showing the correlation between bearing rigidity obtained in this embodiment and bearing rigidity obtained when the relative displacement of the inner and outer races is directly measured by application of static load.
Figure 5:
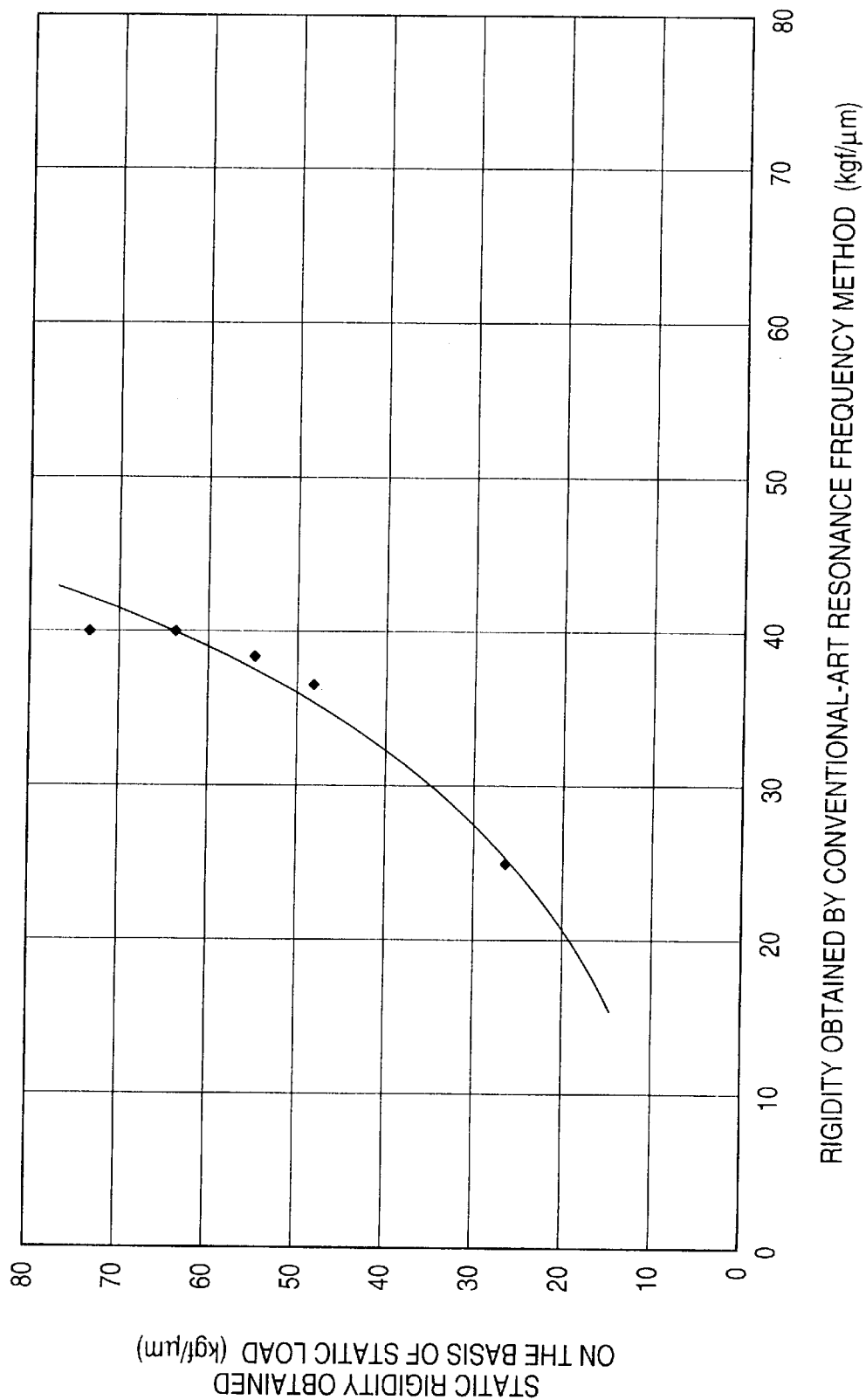
FIG. 5 is a graph showing the correlation between bearing rigidity obtained by a related method using resonance frequency and static rigidity obtained when the relative displacement of the inner and outer races is directly measured by application of static load.
Figure 6:
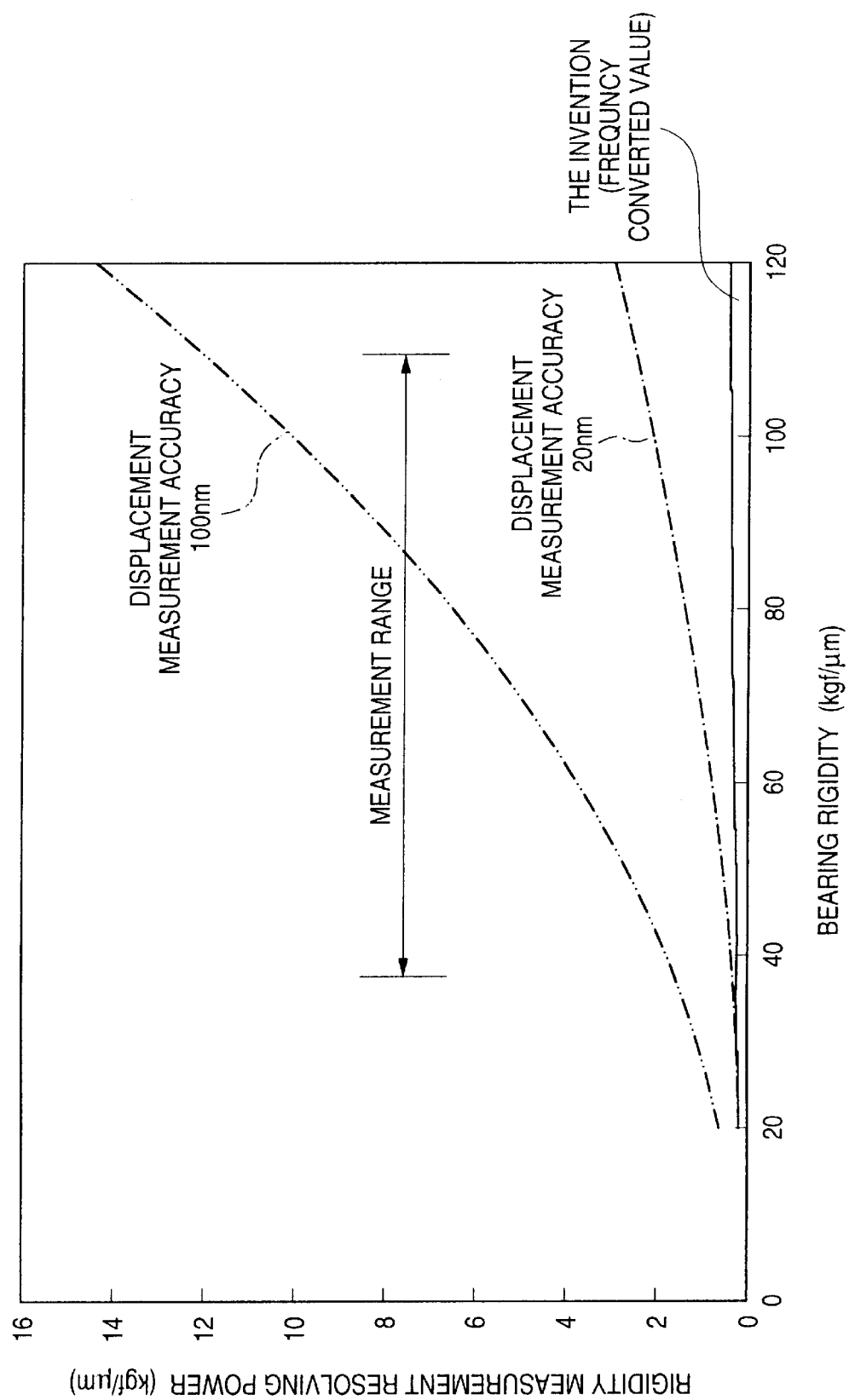
FIG. 6 is a graph showing bearing rigidity measurement resolving power in a related method of obtaining static rigidity by measuring the relative displacement and bearing rigidity measurement resolving power in the method according to this embodiment.

Examples of measurement on the bearing 4 by the bearing rigidity evaluation apparatus according to the present invention will be described below with reference to FIGS. 2A through 6. FIGS. 2A and 2B are graphs showing frequency characteristic in amplitude and phase of the transfer function calculated in the bearing rigidity evaluation apparatus depicted in FIG. 1. FIG. 3 is a graph showing a curve (represented by the solid line) of the relation between natural frequency (resonance frequency) and axial bearing rigidity in a conventional-art rigid-body model and a polynomial (FEM model: dots (♦) in mode 1) used in this embodiment. FIG. 4 is a graph showing the correlation between bearing rigidity obtained in this embodiment and bearing rigidity obtained when the relative displacement of the inner and outer races is directly measured under a static load. FIG. 5 is a graph showing the correlation between bearing rigidity obtained by a conventional-art method using resonance frequency and static rigidity obtained when the relative displacement of the inner and outer races is directly measured under a static load. FIG. 6 is a graph showing bearing rigidity measurement resolving power in the conventional-art method of obtaining static rigidity by measuring relative displacement (Japanese Patent Unexamined Publication No. Hei. 10-96672) and in the method according to this embodiment.

First, a vibrating force having a constant amplitude in a range of from 1 to 5 KHz is generated in the vibration portion 1 to thereby excite the bearing 4 to vibrate. As described above, the vibrations of the excited bearing 4 are vibrations in which vibration modes such as an axial rigid-body mode caused by a bearing spring in the frequency band of the vibrating force, a conical rigid-body mode, a local mode and an elastic bending mode for the outer race 42, are combined with one another.

The vibrations of the excited bearing 4 are detected by the vibration detecting sensors 21a, 21b and 21c. output signals of the vibration detecting sensors 21b and 21c for the outer race 42 are amplified by the corresponding addition amplifiers 22a and 22b respectively and then added up in time sequence by the adder 23. The vibration component of the conical rigid-body mode is erased by this addition. Accordingly, the output of the adder 23 is a signal in which the vibration component of the conical rigid-body mode has been already erased. After the level of the signal is reduced to half by the main amplifier 24a, the signal is supplied to the high-pass filter 25a. The high-pass filter 25a cuts a lower frequency component (500 Hz to 1 KHz) than the measurement frequency band from the input signal. That is, the vibration component in a range of from 500 Hz to 1 KHz as a cause of external noise is cut by the high-pass filter 25a so that S/N ratio is improved.

An output signal of the vibration detecting sensor 21a is amplified by the main amplifier 24b and then supplied to the high-pass filter 25b. The high-pass filter 25b cuts a lower frequency component (500 Hz to 1 KHz) than the measurement frequency band from the input signal, that is, the high-pass filter 25b cuts the vibration component as a cause of external noise in the same manner as in the high-pass filter 25a.

Output signals of the high-pass filters 25a and 25b are supplied to the transfer function computing unit 3a of the computing portion 3. The transfer function computing unit 3a calculates the aforementioned transfer function H by FFT. On the basis of this transfer function, there is obtained a vibration mode in which a resonance frequency (natural frequency) fa appears in a position of $\pi/2$ phase difference from local-mode vibration components (in-phase components) contained in the aforementioned input signals after erasing of the local-mode vibration components. That is, a vibration mode in which an axial rigidity mode and an elastic bending mode for the outer race 42 are coupled with each other is obtained. A frequency at a point (shown in FIG. 2B) having a phase of $-\pi/2$ in the rigidity evaluation band (that is, measurement frequency band) is detected on the basis of the frequency characteristic of vibrations obtained on the basis of the transfer function H. This frequency serves as a resonance frequency (natural frequency) fa. At this point of the resonance frequency (natural frequency) fa, the amplitude becomes the maximum (as shown in FIG. 2A). A waveform curve expressing the frequency characteristic of amplitude and phase is displayed on the waveform display unit 3b.

Incidentally, when there is neither seal nor grease in a double row bearing or a duplex bearing to be measured, attenuation of the bearing is so negligibly small that resonance frequency in the drawing is regarded as equal to natural frequency. In this occasion, there is no difference in evaluation of bearing rigidity even if either a peak frequency (that is, resonance frequency) of the amplitude of a transfer function or a frequency (natural frequency) having a phase difference of $-\pi/2$ is measured.

However, when there is a seal in a single side (shaft flange side) in the double row bearing 4 shown in FIG. 1 or in a duplex bearing or in the case of a finished product having grease enclosed therein, attenuation of the bearing is not negligible. In this case, the resonance frequency varies widely in accordance with the attenuation, so that errors occur in evaluation of bearing rigidity. That is, the resonance frequency shown in FIG. 2A becomes different from the natural frequency having a phase difference of $-\pi/2$ therefrom.

On the contrary, in the present invention, evaluation (natural frequency) due to phase difference can be performed in the aforementioned case. Accordingly, there is no bad influence of variations in attenuation of the bearing, so that measurement accuracy can be kept even when the bearing is used as described above.

The resonance frequency (natural frequency) fa thus obtained is supplied to the rigidity transformation computing unit 3c. The rigidity transformation computing unit 3c calculates bearing rigidity Ka corresponding to the input resonance frequency (natural frequency) fa by use of a polynomial in which the relation between bearing rigidity Ka and resonance frequency (natural frequency) fa obtained in advance by FEM analysis is approximated.

Referring now to FIG. 3, a curve (represented by the solid line) of the relation between natural frequency (resonance frequency) and axial bearing rigidity in a related-art rigid-body model will be compared with a polynomial (FEM model: dots (♦) in mode 1) used in this embodiment. In the related-art rigid-body model, a model of only vibrations of a rigid body is presumed so that a curve of the relation between natural frequency and axial rigidity is assumed for this model. In the related-art rigid-body model, however, axial rigidity is estimated on the basis of the natural frequency of vibrations including vibration modes such as an axial rigid-body mode, a conical rigid-body mode, a local mode and an elastic bending mode for the outer race 42. If axial rigidity becomes high (20 Kgf/$\mu$m or more), difference from the polynomial according to this embodiment becomes so large that axial rigidity cannot be estimated accurately. On the other hand, in the polynomial used in this embodiment, when axial rigidity becomes high, values of rigidity converge so that rigidity sensitivity exhibits a tendency to become dull relative to the natural frequency. Accordingly, when axial rigidity becomes high, higher-order modes for the outer race 42 and coupled vibrations are formed. Accordingly, in this case, reduction of rigidity sensitivity can be suppressed if rigidity is estimated on the basis of a plurality of natural frequencies in consideration of a higher-order mode such as a secondary bending mode represented by dots (■) in FIG. 3, or the like.

Bearing rigidity obtained in this embodiment and static rigidity obtained when the relative displacement of the inner and outer races is directly measured under a static load will be described below with reference to FIG. 4. As is apparent from FIG. 4, there is a high correlation between bearing rigidity obtained in this embodiment and static rigidity obtained when the relative displacement of the inner and outer races is directly measured under a static load. As described above, in this embodiment, there is a linear relation between bearing rigidity obtained on the basis of resonance frequency (natural frequency) and static rigidity. Accordingly, with respect to the bearing 4 in which bearing rigidity becomes so high that an elastic vibration mode for the bearing and a rigid-body vibration mode caused by bearing rigidity are coupled with each other or with respect to the bearing 4 in a negative gap in which local elastic modes for the inner and outer races are mixed, bearing rigidity can be obtained accurately on the basis of the resonance frequency (natural frequency) when the bearing 4 is vibrated.

Referring to FIG. 5, bearing rigidity obtained by the related-art method using resonance frequency (for example, Japanese Patent Unexamined Publication No. Hei.5-10835) will be compared with static rigidity obtained when the relative displacement of the inner and outer races is directly measured under a static load. As is apparent from FIG. 5, there is no linear correlation between bearing rigidity obtained by the related-art method and static rigidity. That is, in the related-art method, bearing rigidity is obtained on the basis of the natural frequency of vibrations including vibration modes such as an axial rigid-body mode, a conical rigid-body mode, a local mode and an elastic bending mode for the outer race 42. Accordingly, when bearing rigidity is high, the local mode inclusive of vibrations of the flange portion 41a of the hub shaft 41, or the like, particularly affects estimation of bearing rigidity so that there is a tendency that bearing rigidity is estimated to be lower. Accordingly, no linear correlation can be obtained between bearing rigidity obtained by the related-art method and static rigidity.

Referring to FIG. 6, measurement resolving power of bearing rigidity in the related-art method of obtaining static rigidity by measuring the relative displacement of the inner and outer races (Japanese Patent Unexamined Publication No. Hei.10-96672) will be compared with measurement resolving power of bearing rigidity in the method according to this embodiment. Incidentally, FIG. 6 shows bearing rigidity measurement resolving power in the case where the relative displacement of the inner and outer races is measured with a displacement measurement accuracy of 100 nm (for example, by moire interference), bearing rigidity measurement resolving power in the case where the relative displacement is measured with a displacement measurement accuracy of 20 nm (for example, by a non-contact type sensor such as a capacitance type displacement measuring unit, a laser displacement measuring unit, or the like) and bearing rigidity measurement resolving power in the case where the relative displacement is measured by the method according to this embodiment (as represented by the solid line). In FIG. 6, the horizontal axis shows reference bearing rigidity, that is, correct bearing rigidity (theoretical value) and the vertical axis shows error between correct bearing rigidity and measured bearing rigidity.

It is apparent from FIG. 6 that, in the method described in Japanese Patent Unexamined Publication No. Hei.10-96672, displacement measuring accuracy has a large influence on the measured value of rigidity so that bearing rigidity is estimated to be higher because the relative displacement of the inner and outer races is measured. That is, in the related-art method, static rigidity is calculated in accordance with the following expression (4). Accordingly, as the relative displacement decreases in the condition that a constant measurement load is applied, that is, as rigidity increases, error in measurement of rigidity increases and measurement resolving power decreases.

$$\text{Static Rigidity=Measurement Load/Relative Displacement of Inner and Outer Races} \quad (4)$$

On the contrary, measurement resolving power of bearing rigidity obtained by the method according to this embodiment, that is, the difference between obtained bearing rigidity and reference bearing rigidity is small in a bearing rigidity measurement range (39 to 110 Kgf) used in a practical level as represented by the solid line in FIG. 6 because resolving power for the frequency 5 KHz of a vibrating force is set to be 4 Hz. It is apparent from this fact that the method according to this embodiment has more excellent measurement resolving power than the related-art method. If the related-art method is expected to have the same measurement resolving power as that in this embodiment, a nano-meter level is required as repeat accuracy of displacement sensors for measuring the relative displacement of the inner and outer races. As a result, it is difficult to evaluate a high-rigid bearing by in-line processing. In this embodiment, however, bearing rigidity is obtained on the basis of resonance frequency (natural frequency). Accordingly, sufficient measurement resolving power can be obtained in the practical-level measurement range even by in-line processing.

As described above, in this embodiment, the bearing 4 is vibrated by a predetermined frequency, and a transfer function between the hub shaft 41 (inner race) and the outer race 42 in the bearing 4 is calculated so that resonance frequency (natural frequency) of a vibration mode caused by bearing rigidity is obtained. Accordingly, both S/N ratio and measurement error which are problematical when a plurality of vibration modes are mixed in the related-art method using resonance frequency, can be improved greatly. Accordingly, bearing rigidity Ka of a bearing to which a preload is applied can be obtained accurately. Further, since accurate bearing rigidity Ka is obtained, an accurate amount of preload Fa can be obtained. Accordingly, quality assurance accuracy with respect to the amount of preload given to the bearing 4 can be improved. In addition, no special device such as a high load generator, a high-accuracy displacement meter, or the like, is required compared with the method of directly obtaining static rigidity by measuring the relative displacement of the inner and outer races on the basis of application of static load. Accordingly, the configuration of the apparatus can be simplified.

Although this embodiment has been described above upon the case where bearing rigidity of a hub III bearing 4 is obtained, bearing rigidity of another bearing, such as another double row bearing or a duplex bearing, different in the shapes of its inner and outer races can be obtained easily if a polynomial in which the relation between bearing rigidity Ka and resonance frequency (natural frequency) fa obtained in advance by a corresponding FEM model is approximated is prepared.

As described above, the bearing rigidity evaluation apparatus includes: a vibrating machine for giving vibrations with a predetermined frequency axially to an inner race of the bearing or to a shaft fitted to the inner race; at least one pair of outer race vibration detecting means respectively provided in positions symmetrical to each other with respect to a point of center of the bearing for detecting vibrations of an outer race of the bearing; an inner race vibration detecting means for detecting vibrations in an axial center position of either one of the inner race and the shaft fitted to the inner race; an addition means for adding output signals of the at least one pair of outer race vibration detecting means; a transfer function computing unit for calculating a resonance frequency (natural frequency) of the bearing by obtaining a transfer function between the outer race and either one of the inner race and the shaft to thereby eliminate an in-phase component signal contained in an output signal of the inner race vibration detecting means and an output signal of the addition means; and a rigidity transformation computing unit for obtaining the bearing rigidity on the basis of the resonance frequency (natural frequency) calculated by the transfer function computing unit.

Accordingly, both the S/N ratio and measurement error which are problematical when a plurality of vibration modes are mixed in the conventional-art method using resonance frequency, can be improved greatly. Accordingly, bearing rigidity of a bearing given preload can be obtained accurately.

The present disclosure relates to the subject matter contained in Japanese patent application No. Hei.10-243178 filed on Aug. 28, 1998 which is expressly incorporated herein by reference in its entirety.

What is claimed is:

1. A bearing rigidity evaluation apparatus for evaluating bearing rigidity of a bearing to which a preload is applied, comprising:

a vibrating unit giving vibrations with a predetermined frequency axially to an inner race of said bearing or to a shaft fitted to said inner race;

at least one pair of outer race vibration detecting units respectively provided in positions symmetrical to each other with respect to a point of center of said bearing and detecting vibrations of an outer race of said bearing;

an inner race vibration detecting unit detecting vibrations in an axial center position of either one of said inner race and said shaft fitted to said inner race;

an addition unit respectively adding output signals of said at least one pair of outer race vibration detecting units;

a transfer function computing unit calculating one of a resonance frequency and a natural frequency of said bearing by obtaining a transfer function between said outer race and either one of said inner race and said shaft so as to eliminate an in-phase component signal contained in an output signal of said inner race vibration detecting unit and an output signal of said addition unit; and a rigidity transformation computing unit obtaining said bearing rigidity on the basis of one of said resonance frequency and said natural frequency calculated by said transfer function computing unit.

2. A bearing rigidity evaluation apparatus according to claim 1, further comprising:

a preload computing unit obtaining the quantity of the preload applied to said bearing, on the basis of a bearing rigidity signal obtained by said rigidity transformation computing unit.

3. A bearing rigidity evaluation apparatus according to claim 1, further comprising:

a high-pass filter provided in an input side of said transfer function computing unit and removing a low-frequency noise signal contained in the output signal of said inner race vibration detecting unit and the output signal of said addition unit.

4. A bearing rigidity evaluation method for evaluating bearing rigidity of a bearing to which a preload is applied, comprising the steps of:

giving vibrations with a predetermined frequency axially to an inner race of said bearing or to a shaft fitted to said inner race;

detecting vibrations of an outer race of said bearing in at least one pair of positions symmetrical to each other with respect to a point of center of said bearing as at least one pair of outer race vibration signals;

detecting vibrations in an axial center position of either one of said inner race and said shaft fitted to said inner race as an inner race vibration signal;

adding said at least one pair of outer race vibration signals, respectively;

calculating one of a resonance frequency and a natural frequency of said bearing by obtaining a transfer function between said outer race and either one of said inner race and said shaft to eliminate an in-phase component signal contained in said inner race vibration signal and an output signal obtained by said adding step; and obtaining said bearing rigidity on the basis of one of said resonance frequency and said natural frequency.

5. A bearing rigidity evaluation method according to claim 4, further comprising the step of:

obtaining the quantity of the preload applied to said bearing on the basis of a bearing rigidity signal obtained in said bearing rigidity obtaining step.

* * * * *